United States Patent
Shen

(10) Patent No.: US 11,202,266 B2
(45) Date of Patent: Dec. 14, 2021

(54) METHOD FOR REPORTING POWER HEADROOM, METHOD FOR RECEIVING POWER HEADROOM, USER EQUIPMENT, BASE STATION, MEDIUM AND SYSTEM

(71) Applicant: SPREADTRUM COMMUNICATIONS (SHANGHAI) CO., LTD., Shanghai (CN)

(72) Inventor: Xingya Shen, Shanghai (CN)

(73) Assignee: SPREADTRUM COMMUNICATIONS (SHANGHAI) CO., LTD., Shanghai (CN)

(*) Notice: Subject to any disclaimer, the term of this patent is extended or adjusted under 35 U.S.C. 154(b) by 0 days.

(21) Appl. No.: 16/961,805

(22) PCT Filed: Dec. 28, 2018

(86) PCT No.: PCT/CN2018/124764
§ 371 (c)(1),
(2) Date: Jul. 13, 2020

(87) PCT Pub. No.: WO2019/137244
PCT Pub. Date: Jul. 18, 2019

(65) Prior Publication Data
US 2021/0007061 A1 Jan. 7, 2021

(30) Foreign Application Priority Data
Jan. 12, 2018 (CN) .......................... 201810033668.4

(51) Int. Cl.
*H04W 52/36* (2009.01)
*H04W 76/27* (2018.01)
(Continued)

(52) U.S. Cl.
CPC ..... *H04W 52/365* (2013.01); *H04W 72/0446* (2013.01); *H04W 72/0453* (2013.01); *H04W 72/14* (2013.01); *H04W 76/27* (2018.02)

(58) Field of Classification Search
CPC .............. H04W 52/365; H04W 76/27; H04W 72/0446; H04W 72/0453; H04W 72/14
See application file for complete search history.

(56) References Cited

U.S. PATENT DOCUMENTS

| 2012/0052903 A1 | 3/2012 | Han et al. | |
| 2012/0218904 A1* | 8/2012 | Narasimha | H04W 52/38 370/248 |

(Continued)

FOREIGN PATENT DOCUMENTS

| CN | 102118787 A | 7/2011 |
| CN | 103931242 A | 7/2014 |

(Continued)

OTHER PUBLICATIONS

HiSilicon Huawei "PHR reporting in different TTI lengths", 3GPP TSG-RAN WG2 Meeting #99b, R2-1709265; Berlin, Germany, Aug. 21-25, 2017, 4 pages.

(Continued)

Primary Examiner — Jeffrey M Rutkowski
Assistant Examiner — Jasper Kwoh
(74) Attorney, Agent, or Firm — Cantor Colburn LLP

(57) ABSTRACT

Method for reporting or receiving power headroom, user equipment, base station, medium and system are provided. The method for reporting power headroom includes: determining a first carrier and a first time slot corresponding to the first carrier for transmitting a PHR; acquiring a second time slot for receiving transmission grant information and corresponding to at least one other carrier; acquiring the third time slot which the uplink data transmission is per- (Continued)

formed in and corresponds to the at least one other carrier; determining whether a time difference between the second and first time slots is less than a threshold; rejecting reporting power headroom corresponding to the third time slot, if it is less than the threshold; reporting the power headroom corresponding to the third time slot, if it is not less than the threshold. Power headroom may be accurately reported to prevent network and UE from misunderstanding the power headroom.

13 Claims, 3 Drawing Sheets

(51) Int. Cl.
*H04W 72/04* (2009.01)
*H04W 72/14* (2009.01)

(56) References Cited

U.S. PATENT DOCUMENTS

| | | | |
|---|---|---|---|
| 2013/0044831 | A1 | 2/2013 | Narasimha et al. |
| 2013/0114505 | A1 | 5/2013 | Haim et al. |
| 2015/0282104 | A1 | 10/2015 | Damnjanovic et al. |
| 2016/0029235 | A1* | 1/2016 | Kim ................ H04W 24/08 370/252 |
| 2017/0013564 | A1 | 1/2017 | Yi et al. |
| 2017/0034793 | A1* | 2/2017 | Uchino ............ H04W 52/365 |
| 2019/0014589 | A1* | 1/2019 | Yerramalli ........ H04W 52/365 |
| 2020/0169966 | A1* | 5/2020 | Chang ............. H04W 72/0406 |
| 2020/0288412 | A1* | 9/2020 | Ajdakple ......... H04L 5/0092 |

FOREIGN PATENT DOCUMENTS

| | | |
|---|---|---|
| CN | 104025675 A | 9/2014 |
| CN | 106165501 A | 11/2016 |
| EP | 2745581 A1 | 6/2014 |
| WO | 2013025300 A1 | 2/2013 |
| WO | 2015188316 A1 | 12/2015 |

OTHER PUBLICATIONS

HiSilicon Huawei "PHR reporting in different TTI lengths", 3GPP TSG-RAN WG2 Meeting #99bis, R2-1711433; Prague, Czech Republic, Oct. 9-13, 2017, 3 pages.
International Search Report for International Application No. PCT/CN2018/124764, dated Mar. 19, 2019.
Written Opinion of the International Searching Authority for International Application No. PCT/CN2018/124764; dated Mar. 19, 2019, with Translation Certificate.
3rd Generation Partnership Project, "Technical Specification Group Radio Access Network;Evolved Universal Terrestrial Radio Access (E-UTRA); Medium Access Control (MAC) protocol specification (Release 15)", 3GPPTS 36.321, V15.0.0. (Dec. 2017); 109 pages.
Huawei et al., "Consideration on PHR triggering and cancellation in NR", 3rd Generation Partnership Project, 3GPP TSG-RAN WG2 #99, (Aug. 21-25, 2017) R2-1709268; 2 pages.
INIPO First Examination Report for corresponding IN Application No. 202027033892; dated Aug. 25, 2021.
The Extended Search Report for corresponding EP Application No. 18900220.7; dated Sep. 23, 2021.

* cited by examiner

US 11,202,266 B2

METHOD FOR REPORTING POWER HEADROOM, METHOD FOR RECEIVING POWER HEADROOM, USER EQUIPMENT, BASE STATION, MEDIUM AND SYSTEM

CROSS-REFERENCE TO RELATED APPLICATIONS

The present application is the national phase of International Application No. PCT/CN2018/124764, filed on Dec. 28, 2018, which claims priority to Chinese patent application No. 201810033668.4, filed on Jan. 12, 2018, and entitled "METHOD FOR REPORTING POWER HEADROOM, METHOD FOR RECEIVING POWER HEADROOM, USER EQUIPMENT, BASE STATION, MEDIUM AND SYSTEM", and the entire disclosure of which is incorporated herein by reference.

TECHNICAL FIELD

The present disclosure generally relates to communication field, and more particularly, to a method for reporting power headroom, a method for receiving power headroom, a user equipment, a base station, a medium and a system.

BACKGROUND

In a Long Term Evolution (LTE) system and a New Radio (NR) system, a User Equipment (UE) needs to transmit a Power Headroom Report (PHR) to a base station. The PHR includes parameters such as power headroom, a maximum transmission power and a cell identifier, which are used to indicate estimated information of used and remaining power of the UE. The base station allocates bandwidth resources and modulation orders for the UE to transmit data based on the PHR.

In existing techniques, when the base station configures "multiple PHRs" for the UE, the UE is required to package power headroom of all uplink carriers that have uplink data transmission at a reporting time of PHRs to one PHR to be reported to the base station. However, due to hardware limitations such as processing capability of chips, in some scenarios, the UE is not capable of processing PHRs of multiple carriers in time, causing a network and the UE to misunderstand the reported power headroom, thereby affecting service quality of the network.

For example, when the UE reports power headroom in a time slot n1 corresponding to a Component Carrier (CC) 1, and receives uplink transmission grant in a time slot n3 of a CC2 to be notified that uplink data needs to be transmitted in a time slot n2, where the time slot n1 and the time slots n2 partially overlap. As pipeline processing capability of the chip is limited, the UE is not capable of packaging the power headroom on the slot n2 corresponding to the CC2 into the PHR corresponding to the slot n1 corresponding to the CC1. However, based on appointment in a protocol, the base station considers that the PHR reported by the UE should include the power headroom on the time slot n2 corresponding to the CC2, causing the network and the UE to misunderstand the reported power headroom, thereby affecting service quality of the network.

SUMMARY

By embodiments of the present disclosure, when time slots corresponding to different carriers are overlapped, power headroom may still be accurately reported to the base station to prevent a network and a UE from misunderstanding the reported power headroom.

In an embodiment of the present disclosure, a method for reporting power headroom is provided, including: determining a first carrier and a first time slot corresponding to the first carrier for transmitting a PHR; acquiring a second time slot for receiving transmission grant information and corresponding to at least one other carrier, where the transmission grant information is used to indicate to perform uplink data transmission in a third time slot; acquiring the third time slot which the uplink data transmission is performed in and corresponds to the at least one other carrier, where the third time slot overlaps with the first time slot in a time domain; determining whether a time difference between the second time slot and the first time slot is less than a preset threshold; rejecting reporting power headroom corresponding to the third time slot, if the time difference between the second time slot and the first time slot is less than the preset threshold; and reporting the power headroom corresponding to the third time slot, if the time difference between the second time slot and the first time slot is greater than or equal to the preset threshold.

Optionally, the method may further include: if rejecting reporting the power headroom corresponding to the third time slot, generating the PHR based on power headroom corresponding to the first time slot; if reporting the power headroom corresponding to the third time slot, generating the PHR based on the power headroom corresponding to the first time slot and the power headroom corresponding to the third time slot; and reporting the PHR to the base station using the first time slot.

Optionally, the method may further include: receiving signaling from the base station, where the signaling includes a preset threshold parameter; and determining the preset threshold based on the preset threshold parameter.

Optionally, the signaling is Radio Resource Control (RRC) signaling.

Optionally, the preset threshold parameter is time length.

Optionally, the number of the at least one other carrier is one or more.

In an embodiment of the present disclosure, a method for receiving power headroom is provided, including: transmitting signaling to a UE, where the signaling includes a preset threshold parameter; and receiving a PHR from the UE.

In an embodiment of the present disclosure, a UE is provided, including: a first determining circuitry configured to determine a first carrier and a first time slot corresponding to the first carrier for transmitting a PHR; a first acquiring circuitry configured to acquire a second time slot for receiving transmission grant information and corresponding to at least one other carrier, where the transmission grant information is used to indicate to perform uplink data transmission in a third time slot; a second acquiring circuitry configured to acquire the third time slot which the uplink data transmission is performed in and corresponds to the at least one other carrier, where the third time slot overlaps with the first time slot in a time domain; a second determining circuitry configured to determine whether a time difference between the second time slot and the first time slot is less than a preset threshold; a first processing circuitry configured to reject reporting power headroom corresponding to the third time slot, if the time difference between the second time slot and the first time slot is less than the preset threshold; and a second processing circuitry configured to report the power headroom corresponding to the third time slot, if the time difference between the second time slot and the first time slot is greater than or equal to the preset threshold.

Optionally, the UE may further include: a generating circuitry configured to: generate the PHR based on power headroom corresponding to the first time slot if the first processing circuitry rejects reporting the power headroom corresponding to the third time slot, and generate the PHR based on the power headroom corresponding to the first time slot and the power headroom corresponding to the third time slot if the first processing circuitry reports the power headroom corresponding to the third time slot; and a reporting circuitry configured to report the PHR to the base station using the first time slot.

Optionally, the UE may further include: a first receiving circuitry configured to receive signaling from the base station, where the signaling includes a preset threshold parameter; and a third determining circuitry configured to determine the preset threshold based on the preset threshold parameter.

Optionally, the signaling is RRC signaling.

Optionally, the preset threshold parameter is time length.

Optionally, the number of the at least one other carrier is one or more.

In an embodiment of the present disclosure, a base station is provided, including: a transmitting circuitry configured to transmit signaling to a UE, where the signaling includes a preset threshold parameter; and a second receiving circuitry configured to receive a PHR from the UE.

In an embodiment of the present disclosure, a computer readable storage medium having computer instructions stored therein is provided, where once the computer instructions are executed, the above method for reporting power headroom or the above method for receiving power headroom is performed.

In an embodiment of the present disclosure, a communication system including a memory and a processor is provided, where the memory has computer instructions stored therein, and once the processor executes the computer instructions, the above method for reporting power headroom or the above method for receiving power headroom is performed.

Embodiments of the present disclosure may provide following advantages. Whether the time difference between the second time slot corresponding to the at least one other carrier and the first time slot corresponding to the first carrier is less than the preset threshold is determined. If the time difference is less than the preset threshold, the UE rejects reporting power headroom corresponding to the third time slot; and if the time difference is greater than or equal to the preset threshold, the UE reports the power headroom corresponding to the third time slot. In this way, power headroom may be accurately reported to the base station to prevent a network and the UE from misunderstanding the reported power headroom.

Further, by transmitting the signaling to the UE and receiving the PHR from the UE, the base station acquires the power headroom of the UE accurately, so as to schedule the UE with high efficiency.

DETAILED DESCRIPTION

In existing techniques, when the base station configures "multiple PHRs" for the UE, the UE is required to package power headroom of all uplink carriers that have uplink data transmission at a reporting time of PHRs to one PHR to be reported to the base station. However, due to hardware limitations such as processing capability of chips, in some scenarios, the UE is not capable of processing PHRs of multiple carriers in time, causing a network and the UE to misunderstand the reported power headroom, thereby affecting service quality of the network.

Figure 1:
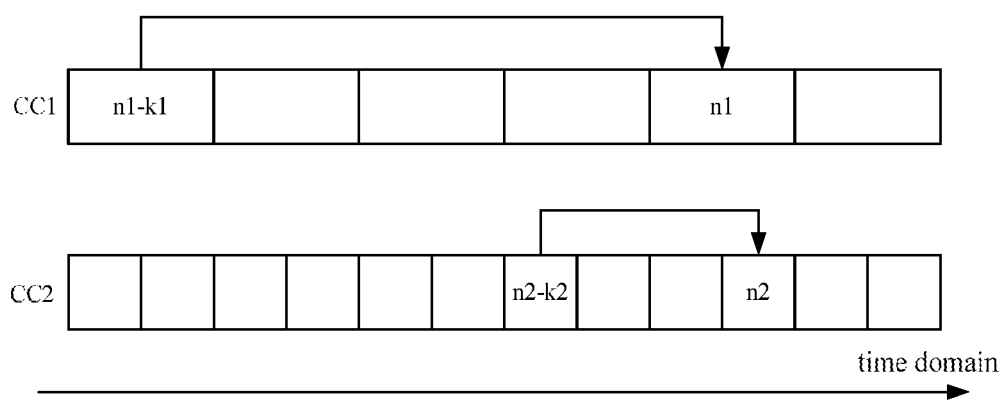
FIG. 1 schematically illustrates that time slots corresponding to different carriers overlap in existing techniques.

Referring to FIG. 1, the UE supports two carriers, CC1 and CC2 respectively. The UE triggers power headroom reporting, and receives an uplink transmission grant of the CC1 at a time point of (n1-k1), which allows reporting a PHR in a time slot n1 corresponding to the CC1, and receives an uplink transmission grant of the CC2 at a time point of (n2-k2), which allows transmitting uplink data in the time slot n2 corresponding to the CC2. As the time slot n1 corresponding to the CC1 and the time slot n2 corresponding to the CC2 partially overlap, when the "multiple PHRs" are configured, the UE is required to package power headroom of the time slot n1 and power headroom of the time slot n2 to one PHR to be reported to the base station. However, due to hardware limitations such as processing capability of chips, in some scenarios, the UE is not capable of packaging the power headroom of the time slot n2 corresponding to the CC2 to the PHR to be reported, causing a network and the UE to misunderstand the reported power headroom, thereby affecting service quality of the network.

In embodiments of the present disclosure, whether the time difference between the second time slot corresponding to at least one other carrier and the first time slot corresponding to the first carrier is less than the preset threshold is determined. If the time difference is less than the preset threshold, the UE rejects reporting power headroom corresponding to the third time slot; and if the time difference is greater than or equal to the preset threshold, the UE reports the power headroom corresponding to the third time slot. In this way, power headroom may be accurately reported to the base station to prevent a network and the UE from misunderstanding the reported power headroom.

In order to clarify the object, solutions and advantages of embodiments of the present disclosure, embodiments of present disclosure will be described clearly in detail in conjunction with accompanying drawings.

Figure 2:
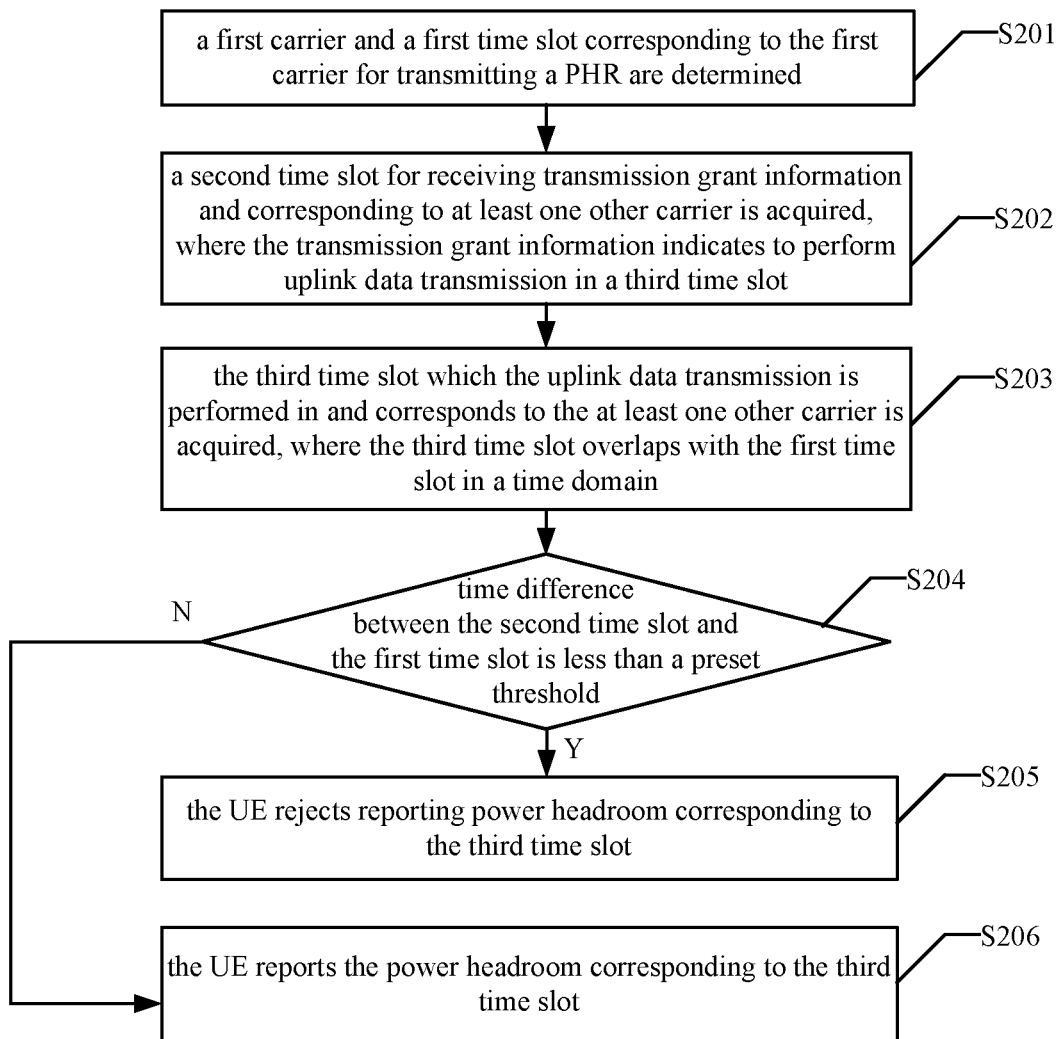
FIG. 2 schematically illustrates a flow chart of a method for reporting power headroom according to an embodiment.

FIG. 2 schematically illustrates a flow chart of a method for reporting power headroom according to an embodiment. Referring to FIG. 2, the method includes S201 to S206.

In S201, a first carrier and a first time slot corresponding to the first carrier for transmitting a PHR are determined.

In some embodiments, when triggering PHR reporting, the UE needs to calculate power headroom on a time slot corresponding to a carrier of reporting the PHR. The power headroom on the time slot corresponding to the carrier of reporting the PHR is calculated according to descriptions in section 7.7.1 or 7.7.2 of 3GPP TS38.213. Power headroom Type 1 is calculated as follows, $$PH_{type\ 1,f,c}(i,j,q_d,l) = P_{CMAX,f,c}(i) - \{P_{O\_PUSCH,f,c}(j) + 10$$
$$\log_{10}(2^{\mu} \cdot M_{RB,f,c}^{PUSCH}(i)) + \alpha_{f,c}(j) \cdot PL_{f,c}(q_d) +$$
$$\Delta_{TF,f,c}(i) + f_{f,c}(i,l)\}[dB],$$

where definitions of $P_{CMAX,f,c}$ (i), $P_{O\_PUSCH,f,c}$ (j), $M_{RB,f,c}^{PUSCH}$ (i), $\alpha_{f,c}$ (j), $PL_{f,c}$ ($q_d$), $\Delta_{TF,f,c}$ (i) and $f_{f,c}$ (i,l) can be found in section 7.1.1 of 3GPP TS38.213, and are not described in detail here.

When the UE transmits a Sounding Reference Signal (SRS), power headroom Type 2 is calculated as follows, $$PH_{type2,f,c}(i,q_s,l) = P_{CMAX,f,c}(i) - \{P_{O\_SRS,f,c}(q_s) + 10$$
$$\log_{10}(2^{\mu} \cdot M_{SRS,f,c}(i)) + \alpha_{SRS,f,c}(q_s) \cdot PL_{f,c}(q_s) \cdot PL_{f,c}$$
$$(q_s) + h_{f,c}(i,l)\}[dB]$$

where definitions of $P_{CMAX,f,c}$ (i), $P_{O\_SRS,f,c}$ ($q_d$), $M_{SRS,f,c}$ (i), $\alpha_{SRS,f,c}$ ($q_s$), $PL_{f,c}$ ($q_s$) and $h_{f,c}$ (i,l) can be found in section 7.3.1 of 3GPP TS38.213, and are not described in detail here.

When the UE does not transmit an SRS, power headroom Type 2 is calculated as follows, $$PH_{type2,f,c}(i,q_s,l) = \tilde{P}_{CMAX,f,c}(i) - \{P_{O\_SRS,f,c}(q_{s0}) + \alpha_{SRS,f,c}$$
$$(q_{s0}) \cdot PL_{f,c}(q_{s0})) + h_{f,c}(i,l)\}[dB],$$

where definitions of $\alpha_{SRS,f,c}$ ($q_s$), $PL_{f,c}$ ($q_s$) and $h_{f,c}$ (i,l) can be found in section 7.3.1 of 3GPP TS38.213, $q_{s0}$ is an SRS resource configured by a high layer, and definition of $\tilde{P}_{CMAX,f,c}$ (i) can be found in section 7.7.2 of 3GPP TS38.213, which are not described in detail here.

In some embodiments, when the UE needs to report power headroom on the first time slot corresponding to the first carrier, power headroom on the first time slot corresponding to the first carrier requires to be calculated. The power headroom on the first time slot corresponding to the first carrier is power headroom corresponding to the first time slot corresponding to the first carrier. Therefore, it is required to determine the first carrier and the first time slot corresponding to the first carrier for transmitting the PHR. On the first time slot, the UE needs to calculate the power headroom and perform packaging and transmission.

In S202, a second time slot for receiving transmission grant information and corresponding to at least one other carrier is acquired, where the transmission grant information indicates to perform uplink data transmission in a third time slot.

In S203, the third time slot which the uplink data transmission is performed in and corresponds to the at least one other carrier is acquired, where the third time slot overlaps with the first time slot in a time domain.

In some embodiments, when the base station configures "multiple PHRs" for the UE, the UE is required to package power headroom of all uplink carriers that have uplink data transmission at a reporting time of PHRs to one PHR to be reported to the base station. Therefore, the third time slot which the uplink data transmission is performed in and corresponds to the at least one other carrier needs to be acquired, and the third time slot overlaps with the first time slot in a time domain.

In some embodiments, due to hardware limitations such as processing capability of chips, the UE is not capable of packaging all the power headroom corresponding to the third time slot into the PHR corresponding to the first time slot. Therefore, a position of a time slot where transmission grant information allowing data to be transmitted in the third time slot is located needs to be determined. For example, the UE receives at a time point of T1 transmission grant information (i.e., scheduling indication information from the base station) which allows the UE to perform uplink data transmission at a time point of T2, where the time point of T1 is the second time slot and the time point of T2 is the third time slot.

In S204, whether a time difference between the second time slot and the first time slot is less than a preset threshold is determined; and if the time difference is less than the preset threshold, S205 is performed, or else, S206 is performed.

In some embodiments, whether a chip is capable of processing the power headroom of the third time slot is determined based on the time difference between the second time slot and the first time slot. If the time difference between the second time slot and the first time slot is less than the preset threshold, it is determined that the time difference is too small. Therefore, it can be determined that the chip is not capable of processing the power headroom of the third time slot. Otherwise, it is determined that the chip is capable of processing the power headroom of the third time slot.

In some embodiments, the preset threshold is determined based on signaling received from the base station. In some embodiments, the method may further include: receiving signaling from the base station, where the signaling includes a preset threshold parameter; and determining the preset threshold based on the preset threshold parameter.

In some embodiments, the signaling is RRC signaling.

In some embodiments, the preset threshold parameter is time length, such as 1 millisecond or 1 microsecond.

In some embodiments, a unit of the time length is millisecond or microsecond.

In some embodiments, a unit of the time length is Orthogonal Frequency Division Multiplexing (OFDM) symbol.

In some embodiments, a unit of the time length is time slot.

In S205, the UE rejects reporting power headroom corresponding to the third time slot.

In some embodiments, if the time difference between the second time slot and the first time slot is less than the preset threshold, it is determined that the chip is not capable of processing the power headroom of the third time slot. Therefore, the UE rejects reporting the power headroom corresponding to the third time slot.

In S206, the UE reports the power headroom corresponding to the third time slot.

In some embodiments, if the time difference between the second time slot and the first time slot is greater than or equal to the preset threshold, it is determined that the chip is capable of processing the power headroom of the third time slot. Therefore, the UE reports the power headroom corresponding to the third time slot.

In some embodiments, if rejecting reporting the power headroom corresponding to the third time slot, the UE generates the PHR based on power headroom corresponding to the first time slot. If reporting the power headroom corresponding to the third time slot, the UE generates the PHR based on the power headroom corresponding to the first time slot and the power headroom corresponding to the third time slot. The PHR is reported to the base station using the first time slot.

In some embodiments, the number of the at least one other carrier is one or more.

By the above embodiments, whether the time difference between the second time slot corresponding to the at least one other carrier and the first time slot corresponding to the first carrier is less than the preset threshold is determined. If the time difference is less than the preset threshold, the UE rejects reporting power headroom corresponding to the third time slot; and if the time difference is greater than or equal to the preset threshold, the UE reports the power headroom corresponding to the third time slot. In this way, power headroom may be accurately reported to the base station to prevent a network and the UE from misunderstanding the reported power headroom.

Figure 3:
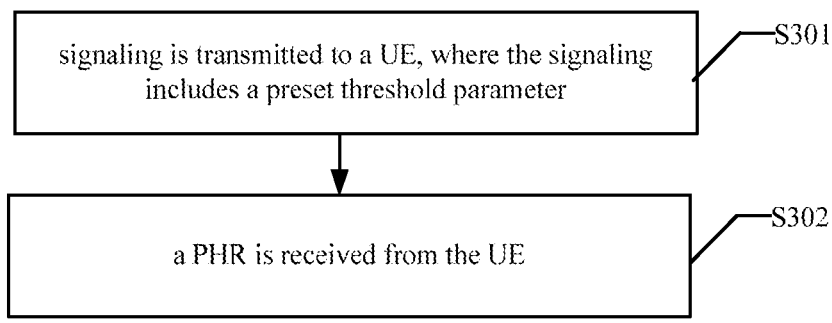
FIG. 3 schematically illustrates a flow chart of a method for receiving power headroom according to an embodiment.

FIG. 3 schematically illustrates a flow chart of a method for receiving power headroom according to an embodiment. Referring to FIG. 3, the method includes S301 and S302.

In S301, signaling is transmitted to a UE, where the signaling includes a preset threshold parameter.

In S302, a PHR is received from the UE.

In the above embodiments, by transmitting the signaling to the UE and receiving the PHR from the UE, the base station acquires the power headroom of the UE accurately, so as to schedule the UE with high efficiency.

Figure 4:
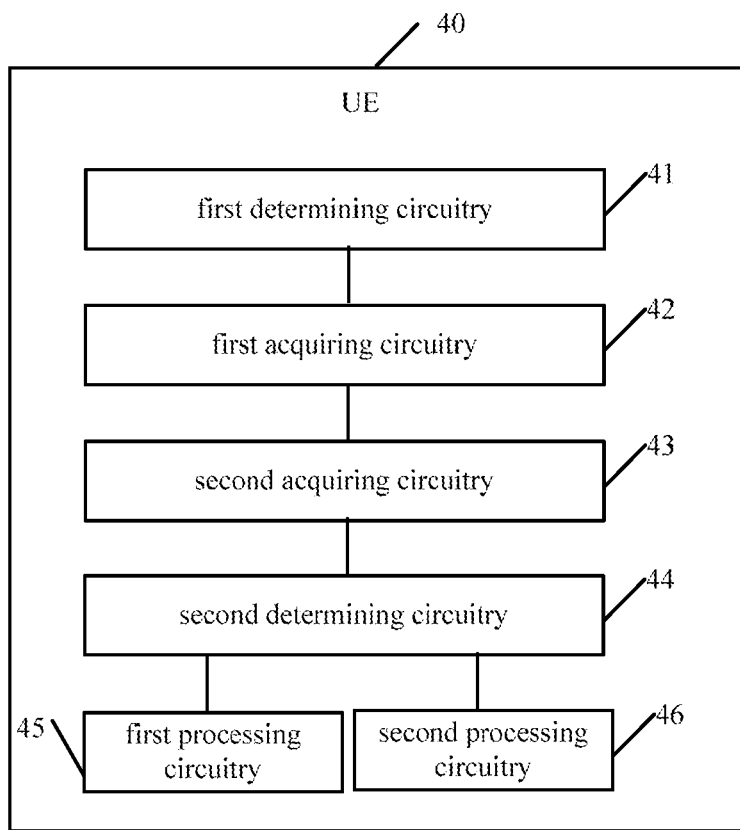
FIG. 4 schematically illustrates a structural diagram of a UE according to an embodiment.

To make those skilled in the art better understand and implement solutions of the present disclosure, embodiments of the present disclosure also provide a UE for implementing the above method for reporting power headroom. FIG. 4 schematically illustrates a structural diagram of the UE.

Referring to FIG. 4, the UE 40 includes a first determining circuitry 41, a first acquiring circuitry 42, a second acquiring circuitry 43, a second determining circuitry 44, a first processing circuitry 45 and a second processing circuitry 46.

The first determining circuitry 41 is configured to determine a first carrier and a first time slot corresponding to the first carrier for transmitting a PHR.

The first acquiring circuitry 42 is configured to acquire a second time slot for receiving transmission grant information and corresponding to at least one other carrier, where the transmission grant information is used to indicate to perform uplink data transmission in a third time slot.

The second acquiring circuitry 43 is configured to acquire the third time slot which the uplink data transmission is performed in and corresponds to the at least one other carrier, where the third time slot overlaps with the first time slot in a time domain.

The second determining circuitry 44 is configured to determine whether a time difference between the second time slot and the first time slot is less than a preset threshold.

The first processing circuitry 45 is configured to reject reporting power headroom corresponding to the third time slot, if the time difference between the second time slot and the first time slot is less than the preset threshold.

The second processing circuitry 46 is configured to report the power headroom corresponding to the third time slot, if the time difference between the second time slot and the first time slot is greater than or equal to the preset threshold.

In some embodiments, the UE 40 may further include a generating circuitry (not shown) and a reporting circuitry (not shown).

The generating circuitry is configured to: generate the PHR based on power headroom corresponding to the first time slot if the first processing circuitry rejects reporting the power headroom corresponding to the third time slot, and generate the PHR based on the power headroom corresponding to the first time slot and the power headroom corresponding to the third time slot if the first processing circuitry reports the power headroom corresponding to the third time slot.

The reporting circuitry is configured to report the PHR to the base station using the first time slot.

In some embodiments, the UE 40 may further include a first receiving circuitry (not shown) and a third determining circuitry (not shown).

The first receiving circuitry is configured to receive signaling from the base station, where the signaling includes a preset threshold parameter.

The third determining circuitry is configured to determine the preset threshold based on the preset threshold parameter.

In some embodiments, the signaling is RRC signaling.

In some embodiments, the preset threshold parameter is time length.

In some embodiments, a unit of the time length is millisecond or microsecond.

In some embodiments, a unit of the time length is OFDM symbol.

In some embodiments, a unit of the time length is time slot.

In some embodiments, the number of the at least one other carrier is one or more.

Operation procedures and principles of the UE 40 can be referred to the descriptions of the method for reporting power headroom provided in the above embodiments, and are not described in detail here.

Figure 5:
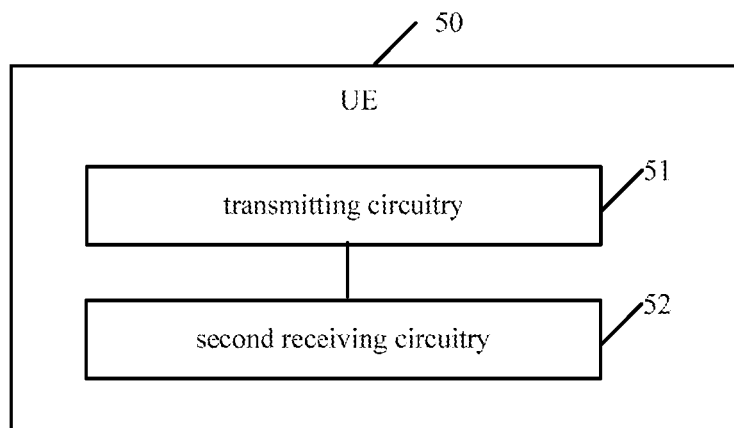
FIG. 5 schematically illustrates a structural diagram of a base station according to an embodiment.

To make those skilled in the art better understand and implement solutions of the present disclosure, embodiments of the present disclosure also provide a base station for implementing the above method for receiving power headroom. FIG. 5 schematically illustrates a structural diagram of the base station.

Referring to FIG. 5, the base station 50 includes a transmitting circuitry 51 and a second receiving circuitry 52.

The transmitting circuitry 51 is configured to transmit signaling to a UE, where the signaling includes a preset threshold parameter.

The second receiving circuitry 52 is configured to receive a PHR from the UE.

Operation procedures and principles of the base station 50 can be referred to the descriptions of the method for receiving power headroom provided in the above embodiments, and are not described in detail here.

In an embodiment of the present disclosure, a computer readable storage medium having computer instructions stored therein is provided, where once the computer instructions are executed, the method for reporting power headroom or the method for receiving power headroom is performed. The computer readable storage medium is a non-volatile or non-transient storage medium.

In an embodiment of the present disclosure, a communication system including a memory and a processor is provided, where the memory has computer instructions stored therein, and once the processor executes the computer instructions, the method for reporting power headroom or the method for receiving power headroom is performed.

Those skilled in the art can understand that all of or a portion of the processes in the method provided in the above embodiments can be implemented by related hardware with instruction of computer program. The computer program may be stored in a readable storage medium, such as a magnetic disk, an optical disk, a Read-Only Memory (ROM) or a Random Access Memory (RAM).

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A method for reporting power headroom, comprising:
determining a first carrier and a first time slot corresponding to the first carrier for transmitting a power headroom report (PHR);
acquiring a second time slot for receiving transmission grant information and corresponding to at least one other carrier, wherein the transmission grant information is used to indicate to perform uplink data transmission in a third time slot;
acquiring the third time slot which the uplink data transmission is performed in and corresponds to the at least one other carrier, wherein the third time slot overlaps with the first time slot in a time domain;
determining whether a time difference between the second time slot and the first time slot is less than a preset threshold;
rejecting reporting power headroom corresponding to the third time slot, if the time difference between the second time slot and the first time slot is less than the preset threshold; and
if the time difference between the second time slot and the first time slot is greater than or equal to the preset threshold, generating the PHR based on the power headroom corresponding to the first time slot and the power headroom corresponding to the third time slot, and reporting the PHR to the base station using the first time slot.

2. The method according to claim 1, further comprising:
if rejecting reporting the power headroom corresponding to the third time slot, generating the PHR based on power headroom corresponding to the first time slot.

3. The method according to claim 1, further comprising:
receiving signaling from the base station, where the signaling comprises a preset threshold parameter; and
determining the preset threshold based on the preset threshold parameter.

4. The method according to claim 3, wherein the signaling is Radio Resource Control (RRC) signaling.

5. The method according to claim 3, wherein the preset threshold parameter is time length.

6. The method according to claim 1, wherein the number of the at least one other carrier is one or more.

7. A User Equipment (UE), comprising:
a first determining circuitry configured to determine a first carrier and a first time slot corresponding to the first carrier for transmitting a power headroom report (PHR);
a first acquiring circuitry configured to acquire a second time slot for receiving transmission grant information and corresponding to at least one other carrier, wherein the transmission grant information is used to indicate to perform uplink data transmission in a third time slot;
a second acquiring circuitry configured to acquire the third time slot which the uplink data transmission is performed in and corresponds to the at least one other carrier, wherein the third time slot overlaps with the first time slot in a time domain;
a second determining circuitry configured to determine whether a time difference between the second time slot and the first time slot is less than a preset threshold;
a first processing circuitry configured to reject reporting power headroom corresponding to the third time slot, if the time difference between the second time slot and the first time slot is less than the preset threshold;
a generating circuitry configured to: if the time difference between the second time slot and the first time slot is greater than or equal to the preset threshold, generate the PHR based on the power headroom corresponding to the first time slot and the power headroom corresponding to the third time slot; and
a reporting circuitry configured to report the PHR to the base station using the first time slot.

8. The UE according to claim 7, wherein
the generating circuitry is further configured to: generate the PHR based on power headroom corresponding to the first time slot if the first processing circuitry rejects reporting the power headroom corresponding to the third time slot.

9. The UE according to claim 7, further comprising:
a first receiving circuitry configured to receive signaling from the base station, where the signaling comprises a preset threshold parameter; and
a third determining circuitry configured to determine the preset threshold based on the preset threshold parameter.

10. The UE according to claim 9, wherein the signaling is Radio Resource Control (RRC) signaling.

11. The UE according to claim 9, wherein the preset threshold parameter is time length.

12. The UE according to claim 7, wherein the number of the at least one other carrier is one or more.

13. A non-transitory computer readable storage medium having computer instructions stored therein, wherein once the computer instructions are executed, a method for reporting power headroom is performed, wherein the method comprises:
determining a first carrier and a first time slot corresponding to the first carrier for transmitting a power headroom report (PHR);
acquiring a second time slot for receiving transmission grant information and corresponding to at least one other carrier, wherein the transmission grant information is used to indicate to perform uplink data transmission in a third time slot;
acquiring the third time slot which the uplink data transmission is performed in and corresponds to the at least one other carrier, wherein the third time slot overlaps with the first time slot in a time domain;
determining whether a time difference between the second time slot and the first time slot is less than a preset threshold;
rejecting reporting power headroom corresponding to the third time slot, if the time difference between the second time slot and the first time slot is less than the preset threshold; and
if the time difference between the second time slot and the first time slot is greater than or equal to the preset threshold, generating the PHR based on the power headroom corresponding to the first time slot and the power headroom corresponding to the third time slot, and reporting the PHR to the base station using the first time slot.

* * * * *